United States Patent
Lin

(10) Patent No.: US 7,193,768 B2
(45) Date of Patent: *Mar. 20, 2007

(54) INTERFERENCE DISPLAY CELL

(75) Inventor: Wen-Jian Lin, Hsinchu (TW)

(73) Assignee: Qualcomm MEMS Technologies, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/807,129

(22) Filed: Mar. 24, 2004

(65) Prior Publication Data
US 2005/0046948 A1 Mar. 3, 2005

(30) Foreign Application Priority Data
Aug. 26, 2003 (TW) .............................. 92123498 A

(51) Int. Cl.
G02B 26/00 (2006.01)

(52) U.S. Cl. .................. 359/291; 359/291; 359/298; 359/224; 359/578; 359/585

(58) Field of Classification Search ........ 359/290–292, 359/298, 223, 224, 578, 585
See application file for complete search history.

(56) References Cited

U.S. PATENT DOCUMENTS

| | | |
|---|---|---|
| 2,534,846 A | 12/1950 | Ambrose et al. |
| 3,439,973 A | 4/1969 | Paul et al. |
| 3,443,854 A | 5/1969 | Weiss |
| 3,653,741 A | 4/1972 | Marks |
| 3,656,836 A | 4/1972 | de Cremoux et al. |
| 3,725,868 A | 4/1973 | Malmer, Jr. et al. |
| 3,813,265 A | 5/1974 | Marks |
| 3,955,880 A | 5/1976 | Lierke |
| 4,099,854 A | 7/1978 | Decker et al. |
| 4,196,396 A | 4/1980 | Smith |
| 4,228,437 A | 10/1980 | Shelton |
| 4,377,324 A | 3/1983 | Durand et al. |
| 4,389,096 A | 6/1983 | Hori et al. |
| 4,403,248 A | 9/1983 | te Velde |
| 4,441,791 A | 4/1984 | Hornbeck |
| 4,445,050 A | 4/1984 | Marks |

(Continued)

FOREIGN PATENT DOCUMENTS

CH  681 047  12/1992

(Continued)

OTHER PUBLICATIONS

Akasaka, "Three-Dimensional IC Trends," Proceedings of IEEE, vol.74, No. 12, pp.1703-1714, (Dec. 1986).

(Continued)

Primary Examiner—Evelyn A. Lester
(74) Attorney, Agent, or Firm—Knobbe, Martens, Olson & Bear, LLP.

(57) ABSTRACT

An optical interference display unit with a first electrode, a second electrode and support structures located between the two electrodes is provided. The second electrode has at least a first material layer and a second material layer. At least one material layer of the two is made from conductive material and the second conductive layer is used as a mask while an etching process is performed to etch the first material layer to define the second electrode.

12 Claims, 4 Drawing Sheets

U.S. PATENT DOCUMENTS

| | | | |
|---|---|---|---|
| 4,459,182 A | 7/1984 | te Velde | |
| 4,482,213 A | 11/1984 | Piliavin et al. | |
| 4,500,171 A | 2/1985 | Penz et al. | |
| 4,519,676 A | 5/1985 | te Velde | |
| 4,531,126 A | 7/1985 | Sadones | |
| 4,566,935 A | 1/1986 | Hornbeck | |
| 4,571,603 A | 2/1986 | Hornbeck et al. | |
| 4,596,992 A | 6/1986 | Hornbeck | |
| 4,615,595 A | 10/1986 | Hornbeck | |
| 4,662,746 A | 5/1987 | Hornbeck | |
| 4,663,083 A | 5/1987 | Marks | |
| 4,681,403 A | 7/1987 | te Velde et al. | |
| 4,710,732 A | 12/1987 | Hornbeck | |
| 4,748,366 A | 5/1988 | Taylor | |
| 4,786,128 A | 11/1988 | Birnbach | |
| 4,790,635 A | 12/1988 | Apsley | |
| 4,856,863 A | 8/1989 | Sampsell et al. | |
| 4,937,496 A | 6/1990 | Neiger et al. | |
| 4,954,789 A | 9/1990 | Sampsell | |
| 4,956,619 A | 9/1990 | Hornbeck | |
| 4,982,184 A | 1/1991 | Kirkwood | |
| 5,018,256 A | 5/1991 | Hornbeck | |
| 5,022,745 A | 6/1991 | Zahowski et al. | |
| 5,028,939 A | 7/1991 | Hornbeck et al. | |
| 5,037,173 A | 8/1991 | Sampsell et al. | |
| 5,044,736 A | 9/1991 | Jaskie et al. | |
| 5,061,049 A | 10/1991 | Hornbeck | |
| 5,075,796 A | 12/1991 | Schildkraut et al. | |
| 5,078,479 A | 1/1992 | Vuilleumier | |
| 5,079,544 A | 1/1992 | DeMond et al. | |
| 5,083,857 A | 1/1992 | Hornbeck | |
| 5,096,279 A | 3/1992 | Hornbeck et al. | |
| 5,099,353 A | 3/1992 | Hornbeck | |
| 5,124,834 A | 6/1992 | Cusano et al. | |
| 5,136,669 A | 8/1992 | Gerdt | |
| 5,142,405 A | 8/1992 | Hornbeck | |
| 5,142,414 A | 8/1992 | Koehler | |
| 5,153,771 A | 10/1992 | Link et al. | |
| 5,162,787 A | 11/1992 | Thompson et al. | |
| 5,168,406 A | 12/1992 | Nelson | |
| 5,170,156 A | 12/1992 | DeMond et al. | |
| 5,172,262 A | 12/1992 | Hornbeck | |
| 5,179,274 A | 1/1993 | Sampsell | |
| 5,192,395 A | 3/1993 | Boysel et al. | |
| 5,192,946 A | 3/1993 | Thompson et al. | |
| 5,206,629 A | 4/1993 | DeMond et al. | |
| 5,214,419 A | 5/1993 | DeMond et al. | |
| 5,214,420 A | 5/1993 | Thompson et al. | |
| 5,216,537 A | 6/1993 | Hornbeck | |
| 5,226,099 A | 7/1993 | Mignardi et al. | |
| 5,228,013 A | 7/1993 | Bik | |
| 5,231,532 A | 7/1993 | Magel et al. | |
| 5,233,385 A | 8/1993 | Sampsell | |
| 5,233,456 A | 8/1993 | Nelson | |
| 5,233,459 A | 8/1993 | Bozler et al. | |
| 5,254,980 A | 10/1993 | Hendrix et al. | |
| 5,272,473 A | 12/1993 | Thompson et al. | |
| 5,278,652 A | 1/1994 | Urbanus et al. | |
| 5,280,277 A | 1/1994 | Hornbeck | |
| 5,287,096 A | 2/1994 | Thompson et al. | |
| 5,296,950 A | 3/1994 | Lin et al. | |
| 5,299,041 A | 3/1994 | Morin et al. | |
| 5,305,640 A | 4/1994 | Boysel et al. | |
| 5,311,360 A | 5/1994 | Bloom et al. | |
| 5,312,513 A | 5/1994 | Florence et al. | |
| 5,323,002 A | 6/1994 | Sampsell et al. | |
| 5,324,683 A | 6/1994 | Fitch et al. | |
| 5,325,116 A | 6/1994 | Sampsell | |
| 5,326,430 A | 7/1994 | Cronin et al. | |
| 5,327,286 A | 7/1994 | Sampsell et al. | |
| 5,331,454 A | 7/1994 | Hornbeck | |
| 5,339,116 A | 8/1994 | Urbanus et al. | |
| 5,345,328 A | 9/1994 | Fritz et al. | |
| 5,365,283 A | 11/1994 | Doherty et al. | |
| 5,381,232 A | 1/1995 | van Wijk | |
| 5,381,253 A | 1/1995 | Sharp et al. | |
| 5,401,983 A | 3/1995 | Jokerst et al. | |
| 5,411,769 A | 5/1995 | Hornbeck | |
| 5,444,566 A | 8/1995 | Gale et al. | |
| 5,446,479 A | 8/1995 | Thompson et al. | |
| 5,448,314 A | 9/1995 | Heimbuch et al. | |
| 5,452,024 A | 9/1995 | Sampsell | |
| 5,454,906 A | 10/1995 | Baker et al. | |
| 5,457,493 A | 10/1995 | Leddy et al. | |
| 5,457,566 A | 10/1995 | Sampsell et al. | |
| 5,459,602 A | 10/1995 | Sampsell | |
| 5,459,610 A | 10/1995 | Bloom et al. | |
| 5,461,411 A | 10/1995 | Florence et al. | |
| 5,489,952 A | 2/1996 | Gove et al. | |
| 5,497,172 A | 3/1996 | Doherty et al. | |
| 5,497,197 A | 3/1996 | Gove et al. | |
| 5,499,062 A | 3/1996 | Urbanus | |
| 5,500,635 A | 3/1996 | Mott | |
| 5,500,761 A * | 3/1996 | Goossen et al. | 359/290 |
| 5,503,952 A | 4/1996 | Suzuki et al. | |
| 5,506,597 A | 4/1996 | Thompson et al. | |
| 5,515,076 A | 5/1996 | Thompson et al. | |
| 5,517,347 A | 5/1996 | Sampsell | |
| 5,523,803 A | 6/1996 | Urbanus et al. | |
| 5,526,051 A | 6/1996 | Gove et al. | |
| 5,526,172 A | 6/1996 | Kanack | |
| 5,526,327 A | 6/1996 | Cordova, Jr. | |
| 5,526,688 A | 6/1996 | Boysel et al. | |
| 5,535,047 A | 7/1996 | Hornbeck | |
| 5,548,301 A | 8/1996 | Kornher et al. | |
| 5,551,293 A | 9/1996 | Boysel et al. | |
| 5,552,924 A | 9/1996 | Tregilgas | |
| 5,552,925 A | 9/1996 | Worley | |
| 5,559,358 A | 9/1996 | Burns et al. | |
| 5,563,398 A | 10/1996 | Sampsell | |
| 5,567,334 A | 10/1996 | Baker et al. | |
| 5,570,135 A | 10/1996 | Gove et al. | |
| 5,579,149 A | 11/1996 | Moret et al. | |
| 5,581,272 A | 12/1996 | Conner et al. | |
| 5,583,688 A | 12/1996 | Hornbeck | |
| 5,589,852 A | 12/1996 | Thompson et al. | |
| 5,597,736 A | 1/1997 | Sampsell | |
| 5,600,383 A | 2/1997 | Hornbeck | |
| 5,602,671 A | 2/1997 | Hornbeck | |
| 5,606,441 A | 2/1997 | Florence et al. | |
| 5,608,468 A | 3/1997 | Gove et al. | |
| 5,610,438 A | 3/1997 | Wallace et al. | |
| 5,610,624 A | 3/1997 | Bhuva | |
| 5,610,625 A | 3/1997 | Sampsell | |
| 5,619,059 A | 4/1997 | Li et al. | |
| 5,619,365 A | 4/1997 | Rhoades et al. | |
| 5,619,366 A | 4/1997 | Rhoads et al. | |
| 5,622,814 A | 4/1997 | Miyata et al. | |
| 5,629,790 A | 5/1997 | Neukermans et al. | |
| 5,633,652 A | 5/1997 | Kanbe et al. | |
| 5,636,052 A | 6/1997 | Arney et al. | |
| 5,636,185 A | 6/1997 | Brewer et al. | |
| 5,638,084 A | 6/1997 | Kalt | |
| 5,638,946 A | 6/1997 | Zavracky | |
| 5,641,391 A | 6/1997 | Hunter et al. | |
| 5,646,768 A | 7/1997 | Kaeriyama | |
| 5,650,881 A | 7/1997 | Hornbeck | |
| 5,654,741 A | 8/1997 | Sampsell et al. | |
| 5,657,099 A | 8/1997 | Doherty et al. | |
| 5,659,374 A | 8/1997 | Gale, Jr. et al. | |
| 5,665,997 A | 9/1997 | Weaver et al. | |
| 5,673,139 A | 9/1997 | Johnson | |
| 5,674,757 A | 10/1997 | Kim | |
| 5,683,591 A | 11/1997 | Offenberg | |

| | | |
|---|---|---|
| 5,703,710 A | 12/1997 | Brinkman et al. |
| 5,706,022 A | 1/1998 | Hato |
| 5,710,656 A | 1/1998 | Goosen |
| 5,726,480 A | 3/1998 | Pister |
| 5,739,945 A * | 4/1998 | Tayebati .................... 359/291 |
| 5,745,193 A | 4/1998 | Urbanus et al. |
| 5,745,281 A | 4/1998 | Yi et al. |
| 5,771,116 A | 6/1998 | Miller et al. |
| 5,784,190 A | 7/1998 | Worley |
| 5,784,212 A | 7/1998 | Hornbeck |
| 5,793,504 A | 8/1998 | Stoll |
| 5,808,780 A | 9/1998 | McDonald |
| 5,818,095 A | 10/1998 | Sampsell |
| 5,825,528 A | 10/1998 | Goosen |
| 5,835,255 A | 11/1998 | Miles ........................ 359/291 |
| 5,842,088 A | 11/1998 | Thompson |
| 5,867,302 A | 2/1999 | Fleming et al. |
| 5,912,758 A | 6/1999 | Knipe et al. |
| 5,943,155 A * | 8/1999 | Goossen .................... 359/247 |
| 5,943,158 A | 8/1999 | Ford et al. |
| 5,959,763 A | 9/1999 | Bozler et al. |
| 5,972,193 A | 10/1999 | Chou et al. |
| 5,976,902 A | 11/1999 | Shih |
| 5,978,127 A * | 11/1999 | Berg ........................ 359/291 |
| 5,986,796 A | 11/1999 | Miles |
| 6,028,690 A | 2/2000 | Carter et al. |
| 6,038,056 A | 3/2000 | Florence et al. |
| 6,040,937 A | 3/2000 | Miles |
| 6,049,317 A | 4/2000 | Thompson et al. |
| 6,055,090 A | 4/2000 | Miles |
| 6,061,075 A | 5/2000 | Nelson et al. |
| 6,099,132 A | 8/2000 | Kaeriyama |
| 6,100,872 A | 8/2000 | Aratani et al. |
| 6,113,239 A | 9/2000 | Sampsell et al. |
| 6,115,326 A | 9/2000 | Puma et al. |
| 6,147,790 A | 11/2000 | Meier et al. |
| 6,160,833 A | 12/2000 | Floyd et al. |
| 6,180,428 B1 | 1/2001 | Peeters et al. |
| 6,195,196 B1 | 2/2001 | Kimura et al. |
| 6,201,633 B1 | 3/2001 | Peeters et al. |
| 6,232,936 B1 | 5/2001 | Gove et al. |
| 6,243,149 B1 | 6/2001 | Swanson et al. |
| 6,282,010 B1 | 8/2001 | Sulzbach et al. |
| 6,284,560 B1 | 9/2001 | Jech et al. |
| 6,295,154 B1 | 9/2001 | Laor et al. |
| 6,323,982 B1 | 11/2001 | Hornbeck |
| 6,351,329 B1 | 2/2002 | Greywall |
| 6,356,254 B1 | 3/2002 | Kimura |
| 6,376,787 B1 | 4/2002 | Martin et al. |
| 6,392,233 B1 | 5/2002 | Channin et al. |
| 6,407,851 B1 | 6/2002 | Islam et al. |
| 6,447,126 B1 | 9/2002 | Hornbeck |
| 6,452,465 B1 | 9/2002 | Brown et al. |
| 6,456,420 B1 | 9/2002 | Goodwin-Johansson |
| 6,465,355 B1 | 10/2002 | Horsley |
| 6,466,354 B1 | 10/2002 | Gudeman |
| 6,466,358 B2 | 10/2002 | Tew |
| 6,473,274 B1 | 10/2002 | Maimone et al. |
| 6,480,177 B2 | 11/2002 | Doherty et al. |
| 6,496,122 B2 | 12/2002 | Sampsell |
| 6,513,911 B1 | 2/2003 | Ozaki et al. |
| 6,545,335 B1 | 4/2003 | Chua et al. |
| 6,548,908 B2 | 4/2003 | Chua et al. |
| 6,549,338 B1 | 4/2003 | Wolverton et al. |
| 6,552,840 B2 | 4/2003 | Knipe |
| 6,574,033 B1 | 6/2003 | Chui et al. |
| 6,589,625 B1 | 7/2003 | Kothari et al. |
| 6,600,201 B2 | 7/2003 | Hartwell et al. |
| 6,606,175 B1 | 8/2003 | Sampsell et al. |
| 6,608,268 B1 | 8/2003 | Goldsmith |
| 6,618,187 B2 * | 9/2003 | Pilossof .................... 359/291 |
| 6,625,047 B2 | 9/2003 | Coleman, Jr., deceased |
| 6,630,786 B2 | 10/2003 | Cummings et al. |
| 6,632,698 B2 | 10/2003 | Ives |
| 6,635,919 B1 | 10/2003 | Melendez et al. |
| 6,643,069 B2 | 11/2003 | Dewald |
| 6,650,455 B2 | 11/2003 | Miles |
| 6,657,832 B2 | 12/2003 | Williams et al. |
| 6,666,561 B1 | 12/2003 | Blakley |
| 6,674,562 B1 | 1/2004 | Miles et al. |
| 6,680,792 B2 | 1/2004 | Miles |
| 6,710,908 B2 | 3/2004 | Miles et al. |
| 6,720,267 B1 | 4/2004 | Chen et al. |
| 6,736,987 B1 | 5/2004 | Cho |
| 6,741,377 B2 | 5/2004 | Miles |
| 6,741,384 B1 | 5/2004 | Martin et al. |
| 6,741,503 B1 | 5/2004 | Farris et al. |
| 6,743,570 B2 | 6/2004 | Harnett et al. |
| 6,747,785 B2 | 6/2004 | Chen et al. |
| 6,747,800 B1 * | 6/2004 | Lin ........................... 359/585 |
| 6,756,317 B2 | 6/2004 | Sniegowski et al. |
| 6,760,146 B2 * | 7/2004 | Ikeda et al. ................ 359/291 |
| 6,768,097 B1 | 7/2004 | Viktorovitch et al. |
| 6,775,174 B2 | 8/2004 | Huffman et al. |
| 6,778,155 B2 | 8/2004 | Doherty et al. |
| 6,778,306 B2 | 8/2004 | Sniegowski et al. |
| 6,794,119 B2 | 9/2004 | Miles |
| 6,811,267 B1 | 11/2004 | Allen et al. |
| 6,812,482 B2 | 11/2004 | Fleming et al. |
| 6,819,469 B1 | 11/2004 | Koba |
| 6,822,628 B2 | 11/2004 | Dunphy et al. |
| 6,829,132 B2 | 12/2004 | Martin et al. |
| 6,853,129 B1 | 2/2005 | Cummings et al. |
| 6,855,610 B2 | 2/2005 | Tung et al. |
| 6,859,218 B1 | 2/2005 | Luman et al. |
| 6,859,301 B1 * | 2/2005 | Islam et al. ................ 359/291 |
| 6,861,277 B1 | 3/2005 | Monroe et al. |
| 6,862,022 B2 | 3/2005 | Slupe |
| 6,862,029 B1 | 3/2005 | D'Souza et al. |
| 6,867,896 B2 | 3/2005 | Miles |
| 6,870,581 B2 | 3/2005 | Li et al. |
| 6,870,654 B2 | 3/2005 | Lin et al. |
| 6,882,458 B2 | 4/2005 | Lin et al. |
| 6,882,461 B1 * | 4/2005 | Tsai et al. .................. 359/290 |
| 6,912,022 B2 * | 6/2005 | Lin et al. ................... 349/105 |
| 6,952,303 B2 | 10/2005 | Lin et al. |
| 6,958,847 B2 * | 10/2005 | Lin ........................... 359/291 |
| 2001/0003487 A1 | 6/2001 | Miles |
| 2001/0026951 A1 | 10/2001 | Vergani et al. |
| 2001/0040649 A1 | 11/2001 | Ozaki |
| 2001/0040675 A1 | 11/2001 | True et al. |
| 2002/0015215 A1 | 2/2002 | Miles |
| 2002/0036304 A1 | 3/2002 | Ehmke et al. |
| 2002/0054424 A1 | 5/2002 | Miles |
| 2002/0055253 A1 | 5/2002 | Rudhard |
| 2002/0071169 A1 | 6/2002 | Bowers et al. |
| 2002/0075555 A1 | 6/2002 | Miles |
| 2002/0126364 A1 | 9/2002 | Miles |
| 2002/0135857 A1 | 9/2002 | Fitzpatrick et al. |
| 2002/0137072 A1 | 9/2002 | Mirkin et al. |
| 2002/0168136 A1 | 11/2002 | Atia et al. |
| 2003/0006468 A1 | 1/2003 | Ma et al. |
| 2003/0043157 A1 | 3/2003 | Miles |
| 2003/0062186 A1 | 4/2003 | Boroson et al. |
| 2003/0072070 A1 | 4/2003 | Miles |
| 2003/0090350 A1 | 5/2003 | Feng et al. |
| 2003/0112096 A1 | 6/2003 | Potter |
| 2003/0138213 A1 | 7/2003 | Jin et al. |
| 2003/0152872 A1 | 8/2003 | Miles |
| 2003/0202264 A1 | 10/2003 | Weber et al. |
| 2003/0202265 A1 | 10/2003 | Reboa et al. |
| 2003/0202266 A1 | 10/2003 | Ring et al. |
| 2004/0010115 A1 | 1/2004 | Sotzing |
| 2004/0027636 A1 | 2/2004 | Miles |
| 2004/0027701 A1 | 2/2004 | Ishikawa |
| 2004/0028849 A1 | 2/2004 | Stark et al. |

| | | | |
|---|---|---|---|
| 2004/0035821 A1 | 2/2004 | Doan et al. | |
| 2004/0051929 A1 | 3/2004 | Sampsell et al. | |
| 2004/0053434 A1 | 3/2004 | Bruner | |
| 2004/0058532 A1 | 3/2004 | Miles et al. | |
| 2004/0061543 A1 | 4/2004 | Nam et al. | |
| 2004/0063322 A1 | 4/2004 | Yang | |
| 2004/0080807 A1 | 4/2004 | Chen et al. | |
| 2004/0080832 A1 | 4/2004 | Singh | |
| 2004/0100677 A1 | 5/2004 | Huibers et al. | |
| 2004/0124073 A1 | 7/2004 | Pilans et al. | |
| 2004/0125281 A1 | 7/2004 | Lin et al. | |
| 2004/0125282 A1 | 7/2004 | Lin et al. | |
| 2004/0136076 A1 | 7/2004 | Tayebati | |
| 2004/0145049 A1 | 7/2004 | McKinnell et al. | |
| 2004/0145811 A1 | 7/2004 | Lin et al. | |
| 2004/0147056 A1 | 7/2004 | McKinnell et al. | |
| 2004/0147198 A1 | 7/2004 | Lin et al. | |
| 2004/0150869 A1 | 8/2004 | Kasai | |
| 2004/0160143 A1 | 8/2004 | Shreeve et al. | |
| 2004/0174583 A1 | 9/2004 | Chen et al. | |
| 2004/0175577 A1 | 9/2004 | Lin et al. | |
| 2004/0179281 A1 | 9/2004 | Reboa | |
| 2004/0191937 A1 | 9/2004 | Patel et al. | |
| 2004/0207897 A1 | 10/2004 | Lin | |
| 2004/0209192 A1 | 10/2004 | Lin et al. | |
| 2004/0209195 A1* | 10/2004 | Lin | 430/315 |
| 2004/0212026 A1 | 10/2004 | Van Brocklin et al. | |
| 2004/0217378 A1 | 11/2004 | Martin et al. | |
| 2004/0217919 A1 | 11/2004 | Pichl et al. | |
| 2004/0218251 A1 | 11/2004 | Pichl et al. | |
| 2004/0218334 A1 | 11/2004 | Martin et al. | |
| 2004/0218341 A1 | 11/2004 | Martin et al. | |
| 2004/0227493 A1 | 11/2004 | Van Brocklin et al. | |
| 2004/0240027 A1 | 12/2004 | Lin et al. | |
| 2004/0240032 A1 | 12/2004 | Miles | |
| 2004/0240138 A1 | 12/2004 | Martin et al. | |
| 2004/0245588 A1 | 12/2004 | Nikkel et al. | |
| 2004/0263944 A1 | 12/2004 | Miles et al. | |
| 2005/0001828 A1 | 1/2005 | Martin et al. | |
| 2005/0003667 A1 | 1/2005 | Lin et al. | |
| 2005/0020089 A1 | 1/2005 | Shi et al. | |
| 2005/0024557 A1* | 2/2005 | Lin | 349/105 |
| 2005/0035699 A1 | 2/2005 | Tsai | |
| 2005/0036095 A1 | 2/2005 | Yeh et al. | |
| 2005/0036192 A1 | 2/2005 | Lin et al. | |
| 2005/0038950 A1 | 2/2005 | Adelmann | |
| 2005/0042117 A1 | 2/2005 | Lin | |
| 2005/0046922 A1 | 3/2005 | Lin et al. | |
| 2005/0046948 A1 | 3/2005 | Lin | |
| 2005/0057442 A1 | 3/2005 | Way | |
| 2005/0068583 A1 | 3/2005 | Gutkowski et al. | |
| 2005/0068605 A1 | 3/2005 | Tsai | |
| 2005/0068606 A1 | 3/2005 | Tsai | |
| 2005/0069209 A1 | 3/2005 | Damera-Venkata et al. | |
| 2005/0078348 A1* | 4/2005 | Lin | 359/291 |
| 2005/0157364 A1* | 7/2005 | Lin | 359/237 |
| 2005/0168849 A1* | 8/2005 | Lin | 359/850 |
| 2005/0195462 A1 | 9/2005 | Lin | |
| 2005/0202649 A1 | 9/2005 | Hung et al. | |

FOREIGN PATENT DOCUMENTS

| | | |
|---|---|---|
| DE | 10228946 A1 | 1/2004 |
| EP | 0 667 548 A1 | 8/1995 |
| EP | 0 694 801 | 1/1996 |
| EP | 0 695 959 | 2/1996 |
| EP | 0 878 824 A2 | 11/1998 |
| EP | 1 197 778 | 4/2002 |
| EP | 1 452 481 A | 9/2004 |
| JP | 05275401 A1 | 10/1993 |
| JP | 2002 062493 | 2/2002 |
| JP | 2003001598 A | 1/2003 |
| JP | 2001-195189 | 9/2003 |
| JP | 2004106074 A | 4/2004 |
| JP | 2005051007 A | 2/2005 |
| WO | WO9530924 | 11/1995 |
| WO | WO9717628 | 5/1997 |
| WO | WO9952006 A2 | 10/1999 |
| WO | WO9952006 A3 | 10/1999 |
| WO | WO0114248 | 3/2001 |
| WO | WO 02/24570 | 3/2002 |
| WO | WO03007049 A1 | 1/2003 |
| WO | WO 03052506 | 6/2003 |
| WO | WO 03/069413 A | 8/2003 |
| WO | WO03069413 A1 | 8/2003 |
| WO | WO03073151 A1 | 9/2003 |
| WO | WO04006003 A1 | 1/2004 |
| WO | WO04026757 A2 | 4/2004 |
| WO | WO 2005/019899 A1 | 3/2005 |

OTHER PUBLICATIONS

Austrian Search Report dated May 4, 2005.
Austrian Search Report dated Aug. 12, 2005.
Aratani K. et al>, "Process and Design Considerations for Survace Micromachined Beams for a Tuneable Interferometer Array in Silicon," Proceedings of the Workshop on Micro Electro Mechanical Systems (MEMS) Fort Lauderale, Feb. 7-10, 1993, New York, IEEE, US, vol. Workshop 6, Feb. 7, 1993, pp. 230-235.
Aratani et al., "Surface micromachined tuneable interferometer array," Sensors and Acuators, pp. 17-23. (1994).
Conner, "Hybrid Color Display Using Optical Interference Filter Array," SID Digest, pp. 577-580 (1993).
EP 05255661.0 European Search Report (Dec. 30, 2005).
Fan et al., "Channel Drop Filters in Photonic Crystals," Optics Express, vol. 3, No. 1 (1998).
Giles et al., "A Silicon MEMS Optical Switch Attenuator and Its Use in Lightwave Subsystems," IEEE Journal of Selected Topics in Quanum Electronics, vol. 5, No. 1 pp. 18-25, (Jan./Feb. 1999).
Goossen et al., "Possible Display Applications of the Silicon Mechanical AntiReflection Switch," Society for Information Display (1994).
Goossen et al., "Silicon Modulator Based on Mechanically-Active Anti-Reflection Layer with I Mbit/sec Capability for Fiber-in-the-Loop Applications," IEEE Photonics Technology Letters, pp. 1119, 1121 (Sep. 1994).
Goossen K. W., "Mems-Based Variable Optical Interference Devices", Optical Mems, 200 IEEE/Leos International Conference on Aug. 21-24, 2000, Piscataway, NJ, USA, IEE, Aug 21, 2000, pp. 17-18.
Gosch, "West Germany Grabs the Lead in X-Ray Lithography," Electronics pp. 78-80 (Feb. 5, 1987).
Harnett et al., "Heat-depolymerizable polycarbonates as electron beam patternable sacrificial layers for nanofluidics," J. Vac. Sci. Technol. B 19(6), (Nov./Dec. 2001), pp.2842-2845.
Howard et al., "Nanometer-Scale Fabrication Techniques," VLSI Electronics: Microstructure Science, vol. 5 pp. 145-153 and pp. 166-173 (1982).
Ibbotson et al., "Comparison of XeF2 and F-atom reactions with Si and SiO2," Applied Physics Letters, vol. 44, No. 12, pp. 1129-1131 (Jun. 1984).
Jackson "Classical Electrodynamics," John Wiley & Sons Inc., pp. 568-573. (date unknown).
Jerman et al., "A Miniture Fabry-Perot Interferometer with a Corrugated Silicon Diaphragm Support," (1988).
Joannopoulos et al., "Photonic Crystals: Molding the Flow of Light," Princeton University Press (1995).
Johnson, "Optical Scanners," Microwave Scanning Antennas, vol. 1, p. 251-261, (1964).
Kim et al., "Control of Optical Transmission Through Metals Perforated With Subwavelength Hole Arrays," Optic Letters vol. 34, No. 4, pp. 256-257, (Feb. 1999).
Lee et al., "Electrostatic Actuation of Surface/Bulk Micromachined Single Crystal Silicon Microresonators", International Conference on Intelligent Robots and Systems, vol. 2, pp. 1057-1062, (Oct. 17-21, 1999).

Lee et al., "The Surface/Bulk Micromachning (SBM) Process: A New Method for Fabricating Released MEMS in a Single Crystal Silicon", Journal of Microelectromechanical Systems, vol. 8, Issue 4, pp. 409-416, (Dec. 1999).

Light over Matter, Circle No. 36 (Jun. 19993).

Lin et al., "Free-Space Micromachined Optical Switches for Optical Networking," IEEE Journal of Selected Topics in Quantum Electronics, vol. 5, No. 1, pp. 4-9. (Jan./Feb. 1999).

Little et al., "Vertically Coupled Microring Resonator Channel Dropping Filter," IEEE Photonics Technology Letters, vol. 11, No. 2, (1999).

Magel, "Integrated Optic Devices Using Micromachined Metal Membranes," SPIE vol. 2686, 08194-2060-Mar. (1996).

Miles, Mark, W., "A New Reflective FPD Technology Using Interferometric Modulation," TheProceedings of the Society for Information Display (May 11-16, 1997).

Newsbreaks, "Quantum-trench devices might operate at terahertz frequencies," Laser Focus World (May 1993).

Oliner et al., "Radiating Elements and Mutual Coupling, " Microwave Scanning Antennas, vol. 2, pp. 131-141, (1966).

PCT/US02/13442, Search Report Sep. 13, 2002.

PCT/US04/20330 Search Report Nov. 8, 2004.

PCT/US05/029821 International Search Report (Dec. 27, 2005).

PCT/US05/030927 International Search Report (Jan. 25,2006).

PCT/US05/031693 International Search Report.

PCT/US05/032231 International Search Report (Apr. 7, 2006).

PCT/US05/033558 Partial International Search Report (Feb. 24, 2006).

PCT/US2004/035820 International Search Report and Written Opinion (Apr. 11, 2005).

PCT/US96/17731 Search Report.

Raley et al., "A Fabry-Perot Microinterferometer for Visible Wavelengths," IEEESolid-State Sensor and Actuator Workshop, Jun. 1992, Hilton Head, SC.

Schnakenberg et al., "TMAHW Etchants for Silicon Micromachining," 1991 International Conference on Solid State Sensors and Actuators-Digest of Technical Papers, pp. 815-818 (1991).

Sperger et al., "High Performance Patterned All-Dielectric Interference Colour Filter for Display Applications," SID Digest, pp. 81-83, (1994).

Sridharan et al. "Post-Packaging Release a New Concept for Surface Micromachined Devices" Technical Digest, IEEE Solid-State Sensor & Actuator Workshop, New York, NY, US, Nov. 8, 1998, pp. 225-228, XP000992464.

Stone, "Radiation and Optics, An Introduction to the Classical Theory," McGrawHill, pp. 340-343, (1963).

Walker et al., "Electron-beam-tunable Interference Filter Spatial Light Modulator," Optics Letters vol. 13, No. 5, pp. 345-347, (May 1988).

Williams et al., "Etch Rates for Micromachining Proscessing," Journal of Microelectromechanical Systems, vol. 5, No. 4, pp. 256-259 (Dec. 1996).

Winters et al., "The etching of silicon with XeF2 vapor. Applied Physics Letters," vol.34, No. 1, pp. 7073 (Jan. 1979).

Winton, "A novel way to capture solar energy," Chemical Week, (May 1985).

Wu, "Design of a Reflective Color LCD Using Opical Interference Reflectors," ASIA Display '95, pp.929-931, (Oct. 1995).

Zhou et al., "Waveguide Panel Display Using Electromechanical Spatial Modulators" SID Digest, vol. XXIX, (1998).

"IEEE Symposium on FPGAs for Custom Computing Machines"; Apr. 15-17, 1998; Napa Valley, California; IEEE Computer Society Technical Committee on Computer Architecture; Edited by Kenneth L. Pocek and Jeffrey M. Arnold.

* cited by examiner

_US 7,193,768 B2_

INTERFERENCE DISPLAY CELL

FIELD OF INVENTION

The present invention relates to a method for manufacturing an optical interference display. More particularly, the present invention relates to a method for manufacturing an optical interference display with posts of arms.

BACKGROUND OF THE INVENTION

Planar displays are popular for portable displays and displays with space limits because they are light and small in size. To date, planar displays in addition to liquid crystal displays (LCD), organic electro-luminescent displays (OLED), plasma display panels (PDP) and so on, as well as a mode of the optical interference display are of interest.

U.S. Pat. No. 5,835,255 discloses an array of display units of visible light that can be used in a planar display. Reference is made to FIG. 1, which depicts a top view of a light interference display unit disclosed in the prior art. A plurality of first electrodes 102 is located in parallel on a substrate 100. A plurality of the second electrodes 104 is located in parallel on the first electrodes 102 and is arranged vertically with the first electrodes 102. A plurality of posts 106 is located between the first electrode 102 and the second electrode 104, and a cavity (not shown) is subsequently formed. Reference is made to FIG. 2, which depicts a cross-sectional view according to a cutting plane line I–I' in FIG. 1. Every optical interference display unit 108 comprises two electrodes, 102 and 104. Posts 106 support these two electrodes 102 and 104, and a cavity 110 is subsequently formed. The distance between these two electrodes 102 and 104, that is, the length of the cavity 110, is D. One of the electrodes 102 and 104 is a semi-transmissible/semi-reflective layer with an absorption rate that partially absorbs visible light, and the other is a light reflective layer that is deformable when voltage is applied. When incident light passes through the electrode 102 or 104 and arrives in the cavity 110, in all visible light spectra, only visible light with wavelength corresponding to formula 1.1 can generate a constructive interference and can be emitted, that is, $$2D = N\lambda \quad (1.1)$$

where N is a natural number.

When the length D of cavity 110 is equal to half the wavelength times any natural number, a constructive interference is generated and a sharp light wave is emitted. In the meantime, if the observer follows the direction of the incident light, a reflected light with wavelength $\lambda_1$ can be observed. Therefore, the display unit 108 is "on".

One of the first electrode 102 and the second electrode 104 is a deformable electrode or a movable electrode. It shifts up and down by applying a voltage. While driven by the voltage, the deformable or movable electrode is deformed and falls down towards another electrode due to the attraction of static electricity. At this time, the distance of the length of the cavity 110 changes. All incident light in the visible light spectrum is filtered out and an observer who follows the direction of the incident light cannot observe any reflected light in the visible light spectrum. The display unit 108 is now "off".

Referring again to FIG. 1, besides the post 106, support structure 112 is located between two second electrodes 104 to support the second electrode 104. Without the support structure 112, the edge of the second electrode 104 sags down due to a lack of support. Therefore, the length of the cavity 110 is not uniform. For the display unit 108, non-uniformity of the length of the cavity 110 results in reflected light with at least two different wave-lengths; therefore, the resolution of the reflected light becomes worse and the display unit may display more than one color.

Reference is made to FIG. 3A, which depicts a cross-sectional view according a cutting plane line II–II' in FIG. 1. The method for forming the structure illustrated in FIG. 3A is depicted in FIG. 3B. A transparent conductive layer, a absorption layer and a dielectric layer (all not shown) are formed sequentially on a transparent substrate 100. The transparent conductive layer, the absorption layer and the dielectric layer form a first electrode 102. A sacrificial layer 114 is then formed on the first electrode 104. The material for forming the dielectric layer comprises silicon oxide and silicon nitride; the material for forming the transparent conductive layer comprises indium tin oxide, indium zinc oxide and indium oxide; and the material for forming the absorption layer is metal. Next, a lithography process and an etching process are performed to form an opening 116 in the sacrificial layer 114 and the first electrode 102. A photoresist layer is spin-coated on the sacrificial layer 114 and fills the opening 116. An exposure process is performed on the photoresist layer and a support structure 112 is formed in the opening 116.

A conductive layer 118 is formed on the support structure 112 and sacrificial layer 114. A spin-coating process and a lithographic process are performed sequentially to form a patterned photoresist layer 120 on the conductive layer 118. An opening in the patterned photoresist layer 120 exposes the underlying conductive layer 118 located on the support structure 112. The patterned photoresist layer 120 is used as an etching mask to remove the exposed conductive layer 118; then, the second electrode 104 settled in parallel with the first electrode 102 illustrated in FIG. 1 is formed. Finally, the photoresist layer 120 is removed and the optical interference display unit 108 is formed.

Generally, a material used to form the support structure 112 is photoresist; therefore, the support structure 112 is always damaged or removed completely in the step of removing the photoresist layer 120 and a structure illustrated in FIG. 3C is formed. Reference is made to FIG. 3C, which depicts cross-sectional views of an optical interference display unit which lack the support structure. Because the support structure is damaged or removed, the edge of the second electrode 104 gets no support and sags in a direction indicated by arrow 105. The length of the cavity 110 is not uniform because of the sagging edge of the electrode 104. Therefore, the disadvantages of a worse resolution and wrong color of the optical interference display unit can't be avoided.

Therefore, it is an important subject to provide a simple method of manufacturing an optical interference display unit structure, for manufacturing a color optical interference display with high resolution, high brightness, simple process and high yield.

SUMMARY OF THE INVENTION

It is therefore an objective of the present invention to provide a method for manufacturing an optical interference display unit structure, which method is suitable for manufacturing a color optical interference display with high resolution.

It is another an objective of the present invention to provide a method for manufacturing an optical interference display unit structure, which method is suitable for manufacturing an optical interference display with a simple and easy manufacturing process and high yield.

It is still another objective of the present invention to provide a method for manufacturing an optical interference display unit structure, which method is suitable for manufacturing optical interference display units where the support structure of the optical interference display unit is not damaged or removed in the process, and which is used to remove the photoresist layer and provide a high quality optical interference display plate.

In accordance with the foregoing objectives of the present invention, one preferred embodiment of the invention provides a method for manufacturing an optical interference display unit structure. The method for manufacturing an optical interference display unit structure disclosed in the present invention protects the support structure from damage or removal by the process, which is used to remove the photoresist layer on the second electrode. The method of fabricating the optical interference display unit structure is to form sequentially a first electrode and a sacrificial layer on a transparent substrate, and then form openings in the first electrode and the sacrificial layer. The openings are suitable for forming posts and support structure therein. Next, a photoresist layer is spin-coated on the sacrificial layer and fills the opening. A photolithographic process patterns the photoresist layer to define a post and the support structure.

At least one first material layer is formed on the sacrificial layer, the post and the support structure after the post and the support structure is formed. A second material layer is then formed on the first material layer. A patterned photoresist layer, which is used as a mask for the next etching process, is formed on the second material layer. An etching process is performed to remove the exposed second material layer and expose a portion of the first material layer and the pattern of the photoresist layer is transferred to the second material layer. The photoresist layer is stripped and the second material layer is used as an etching mask to etch the first material layer to define the second electrode. While stripping the photoresist layer, the support structure is covered and protected by the first material layer, and the support structure is not damaged or removed by the process. Finally, a release etch process is performed to remove the sacrificial layer and an optical interference display unit structure is formed.

The material for forming the second material layer can be any material, capable of transferring the pattern of the photoresist layer thereon and an etch mask while the process for etching the first material layer is performed. Because the second electrode is a deformable electrode or a movable electrode, the preferred material for forming the second material layer is a ductile material, such as metal.

The material for forming the first material layer and the second material layer can be the same, but different is better. Furthermore, if the etching selectivity ratio between the first material layer and the second material layer is not high enough, the second material layer is etched when the etching process to the first material layer is performed, and the thickness of the second material layer becomes thinner than originally intended. The thickness of the second electrode (including the thickness of the second material layer) affects the stress of the second electrode and the operative voltage of the optical interference display unit. How much voltage should be used to operate the optical interference display unit if the thickness of the second material layer after etching process is altered is not known. For the reason disclosed above, the preferred material for forming the second material layer has a high etching selectivity ratio compared to the material for forming the first material layer.

In accordance with the method for manufacturing an optical interference display unit structure in present invention, at least two material layers are used to form the second electrode. The material layer located on the upper position is used to transfer the pattern of the photoresist layer thereon and the other material layers are used to protect the support structure from damage in the process for stripping the patterned photoresist layer. Concurrently, an optical interference display plate with high quality is produced. Therefore, the present invention discloses a method for manufacturing an optical interference display with a simple and easy manufacturing process and high yield.

It is to be understood that both the foregoing general description and the following detailed description are examples, and are intended to provide further explanation of the invention as claimed.

BRIEF DESCRIPTION OF THE DRAWINGS

These and other features, aspects, and advantages of the present invention will be more fully understood by reading the following detailed description of the preferred embodiment, with reference made to the accompanying drawings as follows.

DETAILED DESCRIPTION OF THE PREFERRED EMBODIMENT

In order to provide more information of the optical interference display unit structure, the preferred embodiment is provided herein to explain the optical interference display unit structure in this invention.

Embodiment

Figure 1:
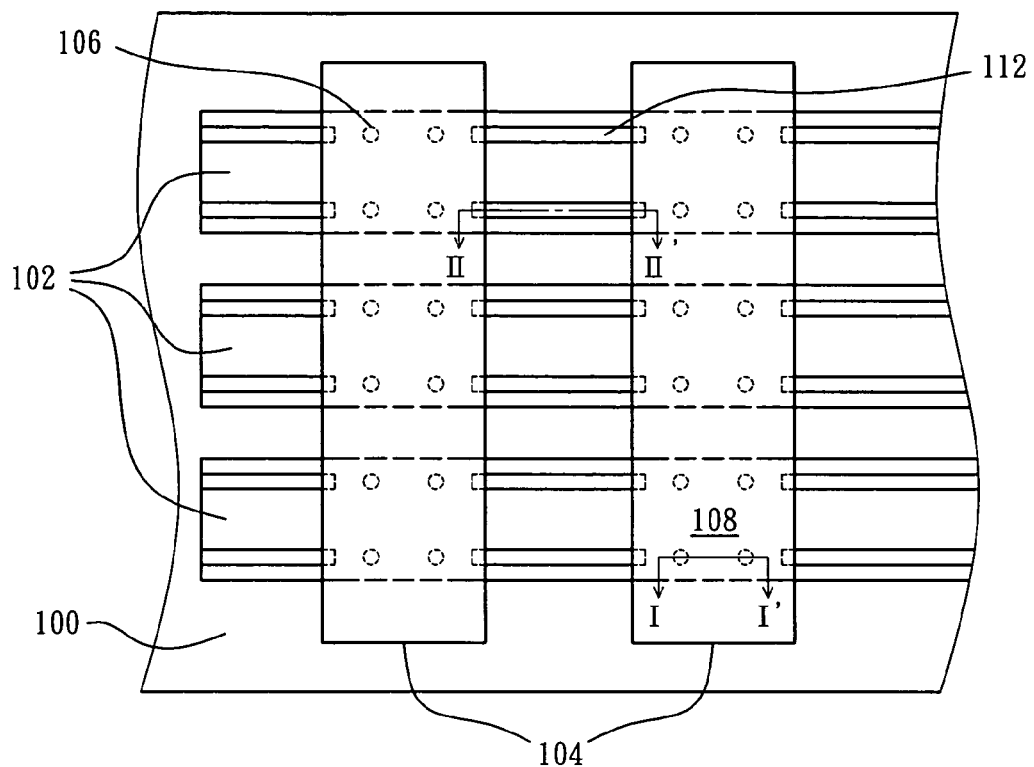
FIG. 1 depicts a top view of a light interference display unit disclosed in the prior art.
Figure 2:
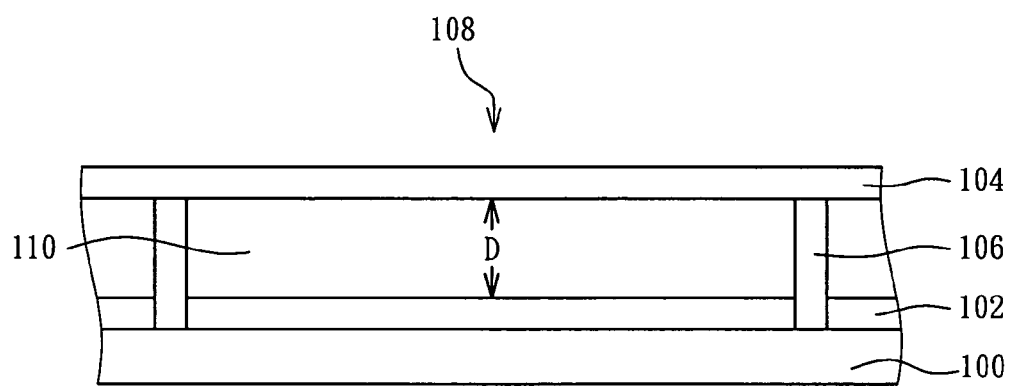
FIG. 2 depicts a cross-sectional view according to a cutting plane line I–I' illustrated in the FIG. 1.
Figure 3A:
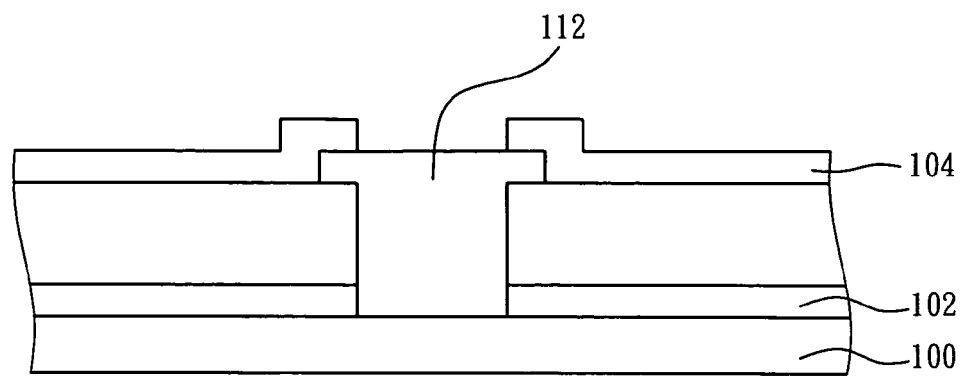
FIG. 3A depicts a cross-sectional view according to a cutting plane line II–II' illustrated in the FIG. 1.
Figure 3B:
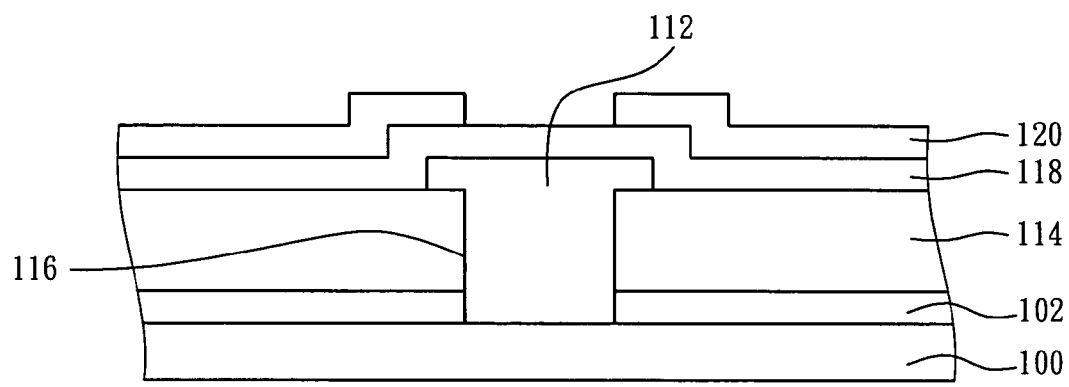
FIG. 3B depicts a method for forming the structure illustrated in FIG. 3A.
Figure 3C:
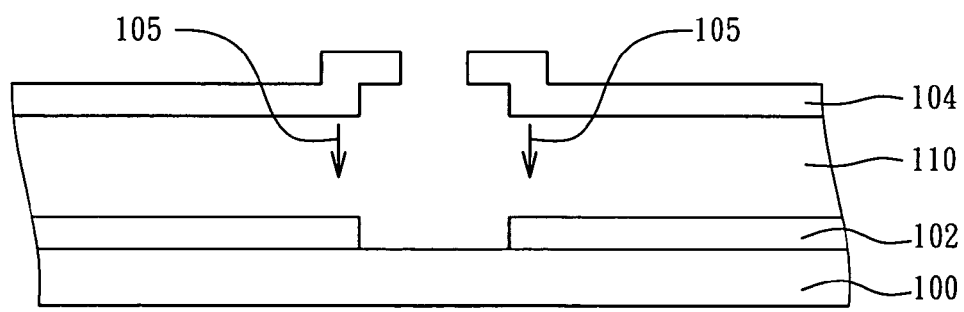
FIG. 3C depicts cross-sectional views of an optical interference display unit, which lacks of the support structure.
Figure 4A:
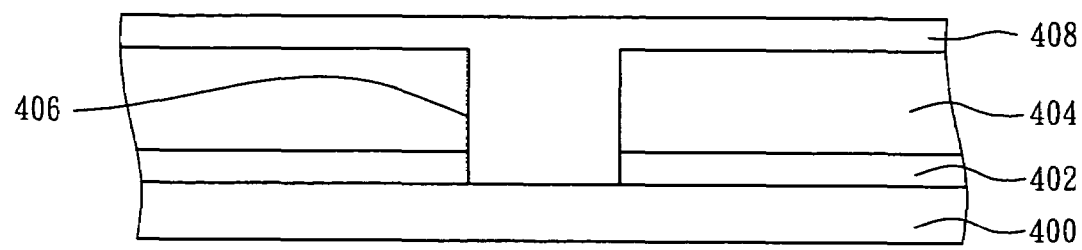
FIGS. 4A to 4D depict a method for manufacturing an optical interference display unit according to one preferred embodiment of this invention.

FIGS. 4A to 4D depict a method for manufacturing an optical interference display unit according to a preferred embodiment of the invention. Reference is made to FIG. 4A first, in which a first electrode 402 and a sacrificial layer 404 are formed in order on a transparent substrate 400. The sacrificial layer 404 is made of transparent materials such as dielectric materials, or opaque materials such as metal materials. Opening 406 is formed in the first electrode 402 and the sacrificial layer 404 by a photolithographic etching process. The opening 406 is suitable for forming a support structure therein. The transparent substrate 400 is, for example, a glass substrate and the first electrode 402 comprises at least one conductive transparent material layer. The conductive transparent material is indium tin oxide (ITO), indium zinc oxide (IZO), or indium oxide (IO).

Next, a material layer 408 is formed on the sacrificial layer 404 and fills the opening 406. The material layer 408 is suitable for forming support structures and posts, and the material layer 408 generally uses photosensitive materials such as photoresists, or non-photosensitive polymer materials such as polyester, polyamide or the like. If non-photosensitive materials are used for forming the material layer 408, a photolithographic etch process is required to define support structures and posts in the material layer 408. In this embodiment, the photosensitive materials are used for forming the material layer 408, so merely a photolithographic etching process is required for patterning the material layer 408.

Figure 4B:
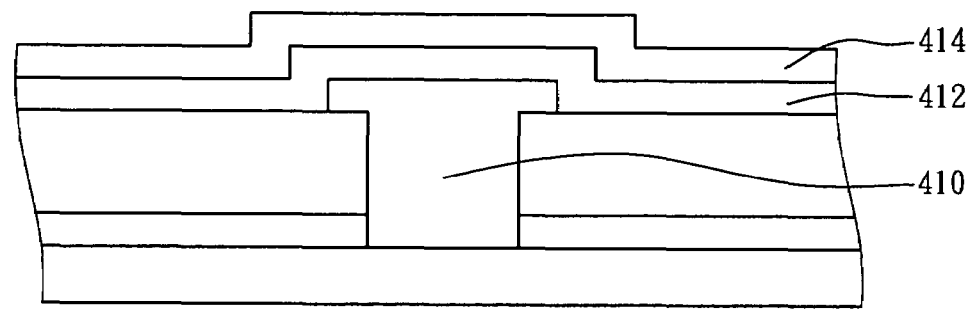

Reference is made to FIG. 4B, in which the support structure 410 and posts (not shown in the scheme) are defined by patterning the material layer 408 during a photolithographic process. After this step, a second material layer 412 and a third material layer 414 are formed sequentially on the sacrificial layer 404 and support structure 410. The second material layer 412 and the third material layer 414 are adapted to form a second electrode; therefore, the material of at least one material layer is conductive material, such as, for example, aluminum, chromium, copper, or cobalt. The material for forming another material layer is metal or dielectric, such as, for example, aluminum, chromium, copper, cobalt, silicon nitride or silicon oxide. The materials for forming the second material layer 412 and the third material layer 414 are aluminum and chromium. Furthermore, the material for forming the second material layer 412 and the third material layer 414 are chromium and aluminum.

Figure 4C:
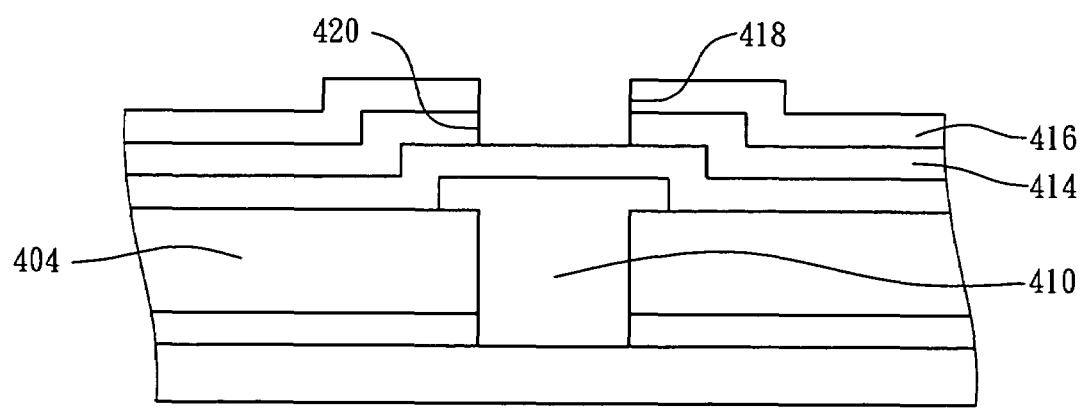

Reference is next made to FIG. 4C. A patterned photoresist layer 416 is formed on the third material layer 414. The patterned photoresist layer 416 has an opening 418, which is located upon the support structure 410. The patterned photoresist layer 416 is used as an etching mask and an etching process is performed to etch the third material layer 414 to form an opening 420. The opening 420 exposes portion of the second material layer 412. The pattern of the patterned photoresist layer is transferred to the third material layer 414.

Figure 4D:
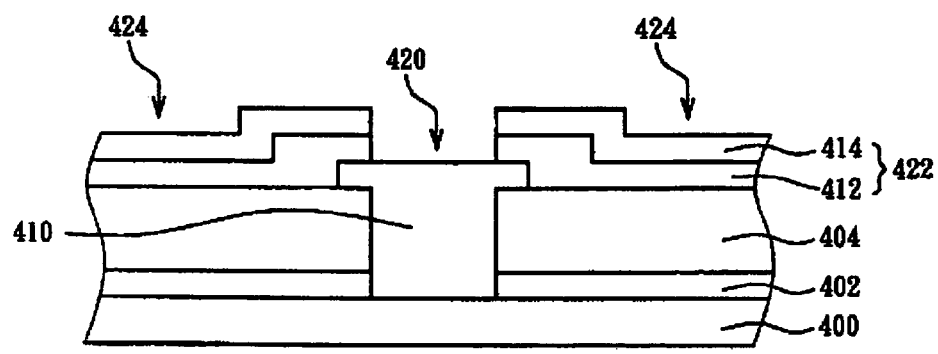

Reference is made to FIG. 4D. The patterned photoresist layer 416 illustrated in FIG. 4C is removed. The third material layer 414 is used as an etching mask and an etching process is performed to etch the exposed second material layer 412 to define a second electrode 422. Finally, a release etch process is performed to remove the sacrificial layer 404 illustrated in FIG. 4C and an optical interference display unit 424 is formed.

Because the material used to form the support structure comprises positive photoresist, negative photoresist, and polymer, such as, for example, acrylic resin and epoxy resin, the material is damaged or removed in the process performed to remove the photoresist layer 416 if the second material layer is absent. Because the support structure is damaged or removed, the edge of the second electrode gets no support and sags. The length of the cavity is not uniform because of the sagging edge of the electrode and the wavelength of the reflective light is thus not uniform; therefore, the resolution of the optical interference display plate becomes worse. However, the present invention discloses a method for fabricating an optical interference display unit, in which a material layer is formed on the support structure to protect the support structure and avoid damaging the support structure during the photoresist layer stripping process. Furthermore, the material for forming the second material layer 412 and the third material layer 414 also can be metal/dielectric or dielectric/metal, such as aluminum/silicon nitride or silicon nitride/aluminum.

Although the present invention has been described in considerable detail with reference certain preferred embodiments thereof, other embodiments are possible. Therefore, their spirit and scope of the appended claims should no be limited to the description of the preferred embodiments container herein. In view of the foregoing, it is intended that the present invention cover modifications and variations of this invention provided they fall within the scope of the following claims and their equivalents.

What is claimed is:

1. An optical interference display unit at least comprising:
a first electrode;
a second electrode, in parallel with the first electrode and comprising:
a material layer; and
a conductive layer on the first material layer; and
a support structure partially covered by the second electrode and supporting an edge of the second electrode;
wherein a material of the conductive layer is more difficult to etch than a material of the first material layer.

2. The optical interference display unit of claim 1, wherein the optical interference display unit is located on a substrate.

3. The optical interference display unit of claim 2, wherein the substrate is a transparent substrate.

4. The optical interference display unit of claim 1, wherein a material of the first electrode is a conductive transparent material.

5. The optical interference display unit of claim 4, wherein the conductive transparent material is indium tin oxide (ITO), indium zinc oxide (IZO), or indium oxide (IO).

6. The optical interference display unit of claim 1, wherein the second electrode is a deformable electrode.

7. The optical interference display unit of claim 1, wherein the second electrode is a movable electrode.

8. The optical interference display unit of claim 1, wherein a material for forming the support structure is selected from a group consisting of positive photoresist, negative photoresist, acrylic resin and epoxy resin.

9. The optical interference display unit of claim 1, wherein the first material layer is made from a conductive material.

10. The optical interference display unit of claim 4 9 wherein a material for forming the first material layer is aluminum, chromium, cobalt, copper, silicon nitride or silicon oxide.

11. The optical interference display unit of claim 1, wherein the first material layer is made from dielectric material.

12. The optical interference display unit of claim 1, wherein a material for forming the conductive layer is aluminum, chromium, cobalt, copper, silicon nitride or silicon oxide.

* * * * *